United States Patent
Wu et al.

(10) Patent No.: US 11,816,467 B2
(45) Date of Patent: Nov. 14, 2023

(54) REFRIGERATOR PRODUCTION LINE, METHOD FOR UPGRADING REFRIGERATOR SOFTWARE ON PRODUCTION LINE AND MEDIUM

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Zongke Wu, Anhui (CN); Zhen Li, Anhui (CN); Jirong Wu, Anhui (CN); Zhi Li, Anhui (CN); Xibing Cheng, Anhui (CN); Zhiguang Liu, Anhui (CN); Yuejin Gao, Anhui (CN); Zhenwei Li, Anhui (CN)

(73) Assignees: HEFEI HUALING CO., LTD., Anhui (CN); HEFEI MIDEA REFRIGERATOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 52 days.

(21) Appl. No.: 17/298,458

(22) PCT Filed: Jul. 30, 2019

(86) PCT No.: PCT/CN2019/098443
§ 371 (c)(1),
(2) Date: May 28, 2021

(87) PCT Pub. No.: WO2020/107924
PCT Pub. Date: Jun. 4, 2020

(65) Prior Publication Data
US 2022/0035618 A1    Feb. 3, 2022

(30) Foreign Application Priority Data

Nov. 28, 2018 (CN) .......................... 201811435515.9

(51) Int. Cl.
G06F 8/65 (2018.01)
G05B 19/042 (2006.01)
G06F 8/71 (2018.01)

(52) U.S. Cl.
CPC ........... *G06F 8/65* (2013.01); *G05B 19/0426* (2013.01); *G06F 8/71* (2013.01); *G05B 2219/2654* (2013.01)

(58) Field of Classification Search
CPC ... G06F 8/65; G06F 8/71; G06F 8/658; G05B 19/0426; G05B 2219/2654
See application file for complete search history.

(56) References Cited

U.S. PATENT DOCUMENTS 5,410,157 A * 4/1995 Davis ..................... G01B 11/04
250/559.19
2003/0217257 A1 11/2003 Ebsen et al.
(Continued)

FOREIGN PATENT DOCUMENTS

| CN | 101853775 A | 10/2010 |
| CN | 102365646 A | 2/2012 |

(Continued)

OTHER PUBLICATIONS

Translated CN107367949 Specification; 17 pages (Year: 2017).*
(Continued)

*Primary Examiner* — S. Sough
*Assistant Examiner* — Cuong V Luu
(74) *Attorney, Agent, or Firm* — Seed IP Law Group LLP

(57) ABSTRACT

A refrigerator production line and a method for upgrading a refrigerator software of an assembled refrigerator on the refrigerator production line are provided. The refrigerator production line includes a conveying device for conveying an assembled refrigerator; a scanning device for scanning and confirming an identification code of the assembled
(Continued)

refrigerator and an address code of a communication module in the assembled refrigerator; and a local server for saving the identification code of the assembled refrigerator and the address code of the communication module and further acquiring, in response to a firmware upgrade request, a firmware upgrading package for the assembled refrigerator that corresponds to the identification code. After the assembled refrigerator is powered on, the communication module receives the firmware upgrade package, and a control module upgrades a public version software program according to the firmware upgrade package.

8 Claims, 2 Drawing Sheets

(56) References Cited

U.S. PATENT DOCUMENTS

| | | | |
|---|---|---|---|
| 2007/0290882 A1 | 12/2007 | Consorte et al. | |
| 2009/0007091 A1* | 1/2009 | Appiah | G06F 8/658 |
| | | | 717/171 |
| 2010/0079260 A1 | 4/2010 | Kiesel et al. | |
| 2010/0214080 A1 | 8/2010 | Alexis | |
| 2017/0329596 A1 | 11/2017 | Butler | |
| 2019/0278579 A1* | 9/2019 | Brian | G06F 8/65 |

FOREIGN PATENT DOCUMENTS

| | | |
|---|---|---|
| CN | 103391705 A | 11/2013 |
| CN | 105865141 A | 8/2016 |
| CN | 107367949 A | 11/2017 |
| CN | 107995284 A | 5/2018 |
| CN | 108446133 A | 8/2018 |
| CN | 108572827 A | 9/2018 |
| CN | 108592305 A | 9/2018 |
| CN | 108829421 A | 11/2018 |
| CN | 109582333 A | 4/2019 |
| RU | 2 295 752 C1 | 3/2007 |

OTHER PUBLICATIONS

Translated CN108572827 Specification; 29 pages (Year: 2018).*
Njabulo Sakhile Mtetwa et al.; Blockchain-Based Security Model for LoRaWAN Firmware Updates; Actuator Netw; 39 pages; retrieved on Feb. 24, 2023 (Year: 2022).*
Konstantinos Arakadakis et al.; Poster Abstract: Incremental firmware update using an efficient differencing algorithm; ACM; pp. 691-692; retrieved on Feb. 24, 2023 (Year: 2020).*

* cited by examiner

REFRIGERATOR PRODUCTION LINE, METHOD FOR UPGRADING REFRIGERATOR SOFTWARE ON PRODUCTION LINE AND MEDIUM

CROSS-REFERENCE TO RELATED APPLICATIONS

This application claims priority to and the benefit of Chinese Patent Application Serial No. 201811435515.9, filed with the National Intellectual Property Administration of P. R. China on Nov. 28, 2018, the entire content of which is incorporated herein by reference.

BACKGROUND

Technical Field

The present disclosure relates to the field of the electrical appliance manufacturing technology, and more particularly to a refrigerator production line and a software upgrade method for a refrigerator in the production line and a medium thereof.

Description of the Related Art

The popularity of a smart refrigerator with a Wi-Fi function has been increasing recently. The Wi-Fi smart refrigerator achieves various functions by a controller programmed with different programs. In the related art, in the process of assembling a refrigerator in a production line, the controllers of the refrigerators of individual machine models are generally programmed with a corresponding program in advance, before the controller is assembled into the refrigerator.

However, the applicant notices that because a hardware facility such as a printed circuit board of the controller of the refrigerator is universal and the controllers of the refrigerators of different machine models have little differences in appearance, there is a probability of installing the controller into a machine model-unmatched and function-unmatched refrigerator during installation of individual controllers which have been programmed with the corresponding programs to perform different functions, thus reducing the product's quality rate and production efficiency.

BRIEF SUMMARY

The present disclosure aims to solve the technical problems in the related art at least to a certain extent.

For this, a first objective of the present disclosure is to provide a refrigerator production line. After the refrigerator production line finishes assembling a refrigerator, a firmware upgrade package is sent to a control module of the assembled refrigerator according to an identification code of individual assembled refrigerators, such that the control module which is stored with a public version software program in advance is upgraded, thus avoiding the problem where a software program of the control module is unmatched with a machine model and a function of the assembled refrigerator due to wrong installation, thereby improving the assembled refrigerator's quality rate and production efficiency.

A second objective of the present disclosure is to provide a software upgrade method for a refrigerator in a production line.

A third objective of the present disclosure is to provide a non-transitory computer-readable storage medium.

In order to achieve the above objectives, in a first aspect, the present disclosure provides a refrigerator production line, including:

a conveying device, configured to convey an assembled refrigerator,
wherein the assembled refrigerator is assembled with a communication module and a control module, and the control module is stored with a public version software program;

a scanning device, configured to scan and confirm an identification code of the assembled refrigerator and an address code of the communication module,
wherein the scanning device is triggered when the assembled refrigerator is conveyed to a scanning region;

a local server, configured to store the identification code of the assembled refrigerator and the address code of the communication module,
wherein the local server is further configured to acquire, in response to a firmware upgrade request, a firmware upgrade package, corresponding to the identification code, for the assembled refrigerator,
wherein after the assembled refrigerator is powered on, the communication module receives the firmware upgrade package, and the control module upgrades the public version software program according to the firmware upgrade package.

According to some embodiments of the present disclosure, after the refrigerator production line finishes assembling the refrigerator, the firmware upgrade package is sent to the control module of the assembled refrigerator according to the identification code of individual assembled refrigerators, such that the control module which is stored with the public version software program in advance is upgraded, thus avoiding the problem where the software program of the control module is unmatched with the machine model and the function of the assembled refrigerator due to wrong installation, thereby improving the assembled refrigerator's quality rate and production efficiency.

In addition, the refrigerator production line according to embodiments of the present disclosure may further include the following additional technical features.

In some embodiments of the present disclosure, the communication module reports its own address code to the local server; the local server determines a corresponding identification code of the assembled refrigerator according to the address code of the communication module, and sends the identification code to the communication module; the communication module provides the identification code to the control module; and the control module parses the identification code to acquire a machine model of a complete machine of the assembled refrigerator, and sends the firmware upgrade request according to the machine model of the complete machine.

In some embodiments of the present disclosure, the refrigerator production line further includes a firmware server, wherein the firmware server is configured to send the latest firmware upgrade package for the assembled refrigerator to the local server.

In some embodiments of the present disclosure, the refrigerator production line further includes a commodity detecting device, wherein the commodity detecting device is configured to detect a refrigeration performance and a power of the assembled refrigerator, wherein the commodity detecting device is triggered when the assembled refrigerator is conveyed to a commodity detecting region.

In some embodiments of the present disclosure, a conveying mode of the conveying device is one of a plate type, a chain type and a drum type, or a combination of more than one of a plate type, a chain type and a drum type.

In some embodiments of the present disclosure, a power supply device is installed on the conveying device, and moves synchronously along with the conveying device.

In order to achieve the above objectives, in other aspect, the present disclosure provides a software upgrade method for a refrigerator in a production line, including the following steps:

conveying an assembled refrigerator, wherein the assembled refrigerator is assembled with a communication module and a control module, and the control module is stored with a public version software program;

confirming that the assembled refrigerator is conveyed to a scanning region, and scanning an identification code of the assembled refrigerator and an address code of the communication module;

storing the identification code of the assembled refrigerator and the address code of the communication module in a corresponding manner, and acquiring, in response to a firmware upgrade request, a firmware upgrade package, corresponding to the identification code, for the assembled refrigerator, such that the public version software program is upgraded according to the firmware upgrade package after the assembled refrigerator is powered on.

According to some embodiments of the present disclosure, for the software upgrade method for a refrigerator in a production line, after the refrigerator is assembled, the firmware upgrade package is sent to the control module of the assembled refrigerator according to the identification code of individual assembled refrigerators, such that the control module which is stored with the public version software program in advance is upgraded, thus avoiding the problem where the software program of the control module is unmatched with the machine model and the function of the assembled refrigerator due to wrong installation, thereby improving the assembled refrigerator's quality rate and production efficiency.

In addition, the software upgrade method for a refrigerator in a production line according to embodiments of the present disclosure further includes the following additional technical features.

In some embodiments of the present disclosure, the software upgrade method for a refrigerator in a production line further includes: the communication module reporting its own address code, receiving the identification code of the assembled refrigerator corresponding to the address code, and providing the identification code to the control module; and the control module parsing the identification code to acquire a machine model of a complete machine of the assembled refrigerator, and sending the firmware upgrade request according to the machine model of the complete machine.

In some embodiments of the present disclosure, the software upgrade method for a refrigerator in a production line further includes: confirming that the assembled refrigerator is conveyed to a commodity detecting region, and detecting a refrigeration performance and a power of the assembled refrigerator.

In order to achieve the above objectives, in other aspect, the present disclosure provides a non-transitory computer-readable storage medium having stored therein a computer program that, when executed by a processor, achieves a software upgrade method for a refrigerator in a production line as described above.

The additional aspects and advantages of the present disclosure will be partially given in the following description, and some will become obvious from the following description, or be understood through the practice of the present disclosure.

BRIEF DESCRIPTION OF THE DRAWINGS

The above and/or additional aspects and advantages of the present disclosure will become obvious and easy to understand from the following description of the embodiments in conjunction with the accompanying drawings.

DETAILED DESCRIPTION

Figure 1:
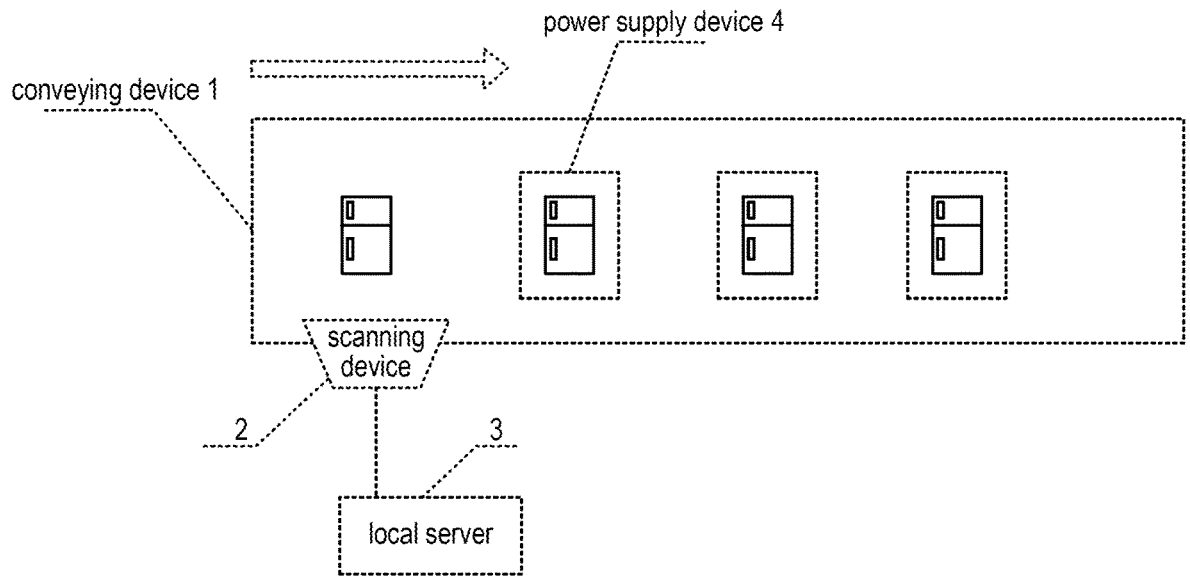
FIG. 1 is a schematic structural diagram showing a refrigerator production line according to embodiments of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The embodiments of the present disclosure mainly focus on solving the technical problem in the related art that, in the process of assembling a refrigerator in a production line, during installation of individual controllers which have been programmed with corresponding programs to perform different functions, there is a probability of installing a controller into a machine model-unmatched and function-unmatched refrigerator, due to little differences in appearance of the individual controllers of different machine models of the refrigerators, thus reducing the product's quality rate and production efficiency.

According to embodiments of the present disclosure, for a refrigerator production line, after a refrigerator is assembled and conveyed, a firmware upgrade package is sent to a control module of the assembled refrigerator according to an identification code of the assembled refrigerator, such that the control module which is stored with a public version software program in advance is upgraded, thus avoiding the problem where the software program of the control module is unmatched with the machine model and the function of the assembled refrigerator due to wrong installation, thereby improving the assembled refrigerator's quality rate and production efficiency.

The refrigerator production line and the software upgrade method for a refrigerator in the production line according to embodiments of the present disclosure will be described below with reference to the accompany drawings.

FIG. 1 is a schematic structural diagram showing a refrigerator production line according to embodiments of the present disclosure. As shown in FIG. 1, the refrigerator production line includes: a conveying device 1, a scanning device 2, a local server 3 and a power supply device 4, all of which may be installed in the refrigerator production line in a sequence shown in the drawing. In specific, the scanning device 2 may be connected to the local server 3 in a wired or wireless manner, to send data to the local server 3; and the power supply device 4 may be installed on the conveying device 1. For example, a power supply socket of the power supply device 4 is arranged on a carrying surface of the conveying device 1, to move synchronously along with the conveying device 1.

It should be noted that the assembled refrigerator in embodiments of the present disclosure includes a communication module and a control module. The communication module may establish connection to the local server 3 in the wireless connection manner such as Wi-Fi, to interact with the local server 3. The control module is pre-stored with a public version software program suitable for various machine models. The public version software program may be provided a firmware upgrade, and then execute corresponding functions of the assembled refrigerator of different machine models according to the upgraded software program.

Next, further referring to FIG. 1, detailed description is made for the refrigerator production line according to embodiments of the present disclosure.

The conveying device 1 is configured to convey the assembled refrigerator according to embodiments of the present disclosure.

In specific, the conveying device 1 is a continuous conveying machine with a chain plate or a belt as a carrier and a traction member for the assembled refrigerator. A conveying mode of the conveying device 1 may be any one of a plate type, a chain type and a drum type, or a combination of more than one of a plate type, a chain type and a drum type. In the process of conveying the assembled refrigerator, the carrying surface of the conveying device 1 cyclically moves in a direction shown by the arrow in FIG. 1, to carry and continuously drive the assembled refrigerator to move forward.

Further, in embodiments of the present disclosure, the conveying device 1 may further convey and assemble a refrigerator to be assembled. A door, a tank, and various parts of the refrigerator to be assembled may be assembled on the conveying device 1. For example, the communication module and control module of the refrigerator to be assembled may be installed at a corresponding position in the refrigerator to be assembled by mechanic equipment such as a robot arm on the conveying device 1. Further, after the refrigerator to be assembled is assembled, the assembled refrigerator is conveyed to a position where the scanning device 2 is located.

The scanning device 2 is configured to scan and confirm an identification code of the assembled refrigerator and an address code of the communication module. The scanning device is triggered when the assembled refrigerator is conveyed to a scanning region.

In specific, the scanning device 2 may confirm that the assembled refrigerator is moved to the scanning region of the scanning device 2 along with the conveying device 1 by judging whether an emitted detection signal is reflected by the assembled refrigerator, or the like. Next, in some embodiments, the scanning device 2 may emit an infrared light in the scanning region to scan the identification code (e.g., Serial Number (SN)) and the address code of the communication module (Media Access Control Address (MAC)) preset on the body of the assembled refrigerator. The identification code of the assembled refrigerator may be set as a barcode and/or a two-dimensional code according to actual requirements, so as to be easily scanned and recognized by the scanning device 2 to distinguish individual assembled refrigerators.

It should be noted that, in order to improve the efficiency and the success rate of the scanning device 2 when scanning the identification code and the address code preset on the assembled refrigerator, the scanning region of the scanning device 2 may be arranged according to positions where the identification code and the address code are located on the assembled refrigerator, individual areas of the identification code and the address code, and a space between individual assembled refrigerators. For example, when the identification code is a combination of a barcode and a two-dimensional code, the area of the scanning region is set to be larger than the area of the scanning region when the identification code is the barcode only, thus avoiding problems that the identification code and the address code preset on the assembled refrigerator are scanned incompletely due to an over-small area arranged for the scanning region, or the identification codes and the address codes belonging to two adjacent assembled refrigerators are scanned at the same time due to an over-large area arranged for the scanning region, when a distance between such two adjacent assembled refrigerators is relative small.

Further, the scanning device 2 identifies the identification code of the assembled refrigerator and the address code of the communication module according to infrared reflection results of the identification code and the address code preset on the assembled refrigerator, and sends decoded data to the local server 3.

The local server 3 is configured to store the identification code of the assembled refrigerator and the address code of the communication module. The local server 3 is further configured to acquire, in response to a firmware upgrade request, a firmware upgrade package, corresponding to the identification code, for the assembled refrigerator.

In specific, the local server 3 first receives the identification code of the assembled refrigerator and the address code of the communication module sent by the scanning device 2, then generates a mapping relationship between the identification code of the assembled refrigerator and the address code of the communication module, stores the mapping relationship, to facilitate receiving the firmware upgrade request sent by the assembled refrigerator, and acquires the firmware upgrade package, corresponding to the identification code, for the assembled refrigerator according to the mapping relationship.

In some embodiments, as an implementation of sending the firmware upgrade request, after passing through the scanning region, the assembled refrigerator is first moved by the conveying device 1 to a position where the power supply device 4 is located. The power supply device 4 may be connected, through the power supply socket or the like, to the assembled refrigerator for power supply. As described in the above example, the power supply device 4 moves synchronously along with the conveying device 1 in the process of conveying the assembled refrigerator, so as to continuously supply power to the assembled refrigerator.

The assembled refrigerator is then powered on; and the control module runs the pre-stored public version software. At the same time, the communication module sends its own address code to the local server 3 through a wireless network; and the local server 3 receives the address code; acquires the identification code of the assembled refrigerator corresponding to said address code of the communication module according to the stored mapping relationship between the identification code of the assembled refrigerator and the address code of the communication module; and sends the identification code to the communication module.

Further, the communication module provides the received identification code to the control module; the control module receives the identification code and then stores the identification code to a memory unit of the control module, such that the control module is programmed with the identification code of the current assembled refrigerator through the communication module, thus avoiding manual wiring processing, thereby improving the production efficiency of the assembled refrigerator and the accuracy of the controller acquiring the identification code.

Further, the control module parses the stored identification code; acquires a machine model of a complete machine of the assembled refrigerator according to information corresponding to the identification code; generates, according to the determined machine model of the complete machine, an Over-the-Air (OTA) download instruction that is an instruction remotely upgrading the preset public version software program to the latest version of the software program corresponding to the current machine model of the assembled refrigerator; and then sends the OTA instruction including the current machine model of the assembled refrigerator to the communication module. The communication module receives the instruction and sends the firmware upgrade request based on the current machine model of the complete machine to the local server 3.

Further, the local server 3 receives the firmware upgrade request; acquires the machine model of the complete machine in the firmware upgrade request, queries in database the mapping relationship between the machine model of the complete machine and the executable function of the assembled refrigerator that is pre-stored; determines an upgrade content of the public version software program; acquires the latest version of the firmware upgrade package including such upgrade content; and sends such firmware upgrade package to the communication module. After receiving the firmware upgrade package, the communication module sends the firmware upgrade package to the control module, so that the control module is upgraded according to the firmware upgrade package for the public version software program, to execute a preset function of the assembled refrigerator of the current machine model. Therefore, the firmware upgrade package is acquired according to the machine model of the complete machine of the current assembled refrigerator, and the control module which is pre-stored with the public version software program is upgraded.

For example, the local server 3 queries the preset mapping relationship; determines that the assembled refrigerator of the machine model A of the complete machine is able to execute remote control and automatic temperature adjustment functions; and sends the firmware upgrade package with the upgrade content of remote control and automatic temperature adjustment to the assembled refrigerator. After the assembled refrigerator is installed with the firmware upgrade package, the control module may execute the remote control and automatic temperature adjustment functions according to the upgraded software program.

It should be noted that, in practical application, the local server 3 may acquire the firmware upgrade package that matches the machine models of individual complete machines by different manners.

As an example, the local server 3 may be pre-stored with the firmware upgrade packages corresponding to all machine models of the assembled refrigerators in the database; determine the machine model of the current assembled refrigerator, and locally acquire the firmware upgrade package that matches the current machine model according to the corresponding relationship between the pre-stored machine models and the types of the firmware upgrade packages.

As another example, the local server 3 determines the machine model and the executable function of the current assembled refrigerator; sends information such as the machine model and the executable function of the assembled refrigerator to a backstage cloud server; and acquires the firmware upgrade package of the current assembled refrigerator through the backstage cloud server.

Figure 2:
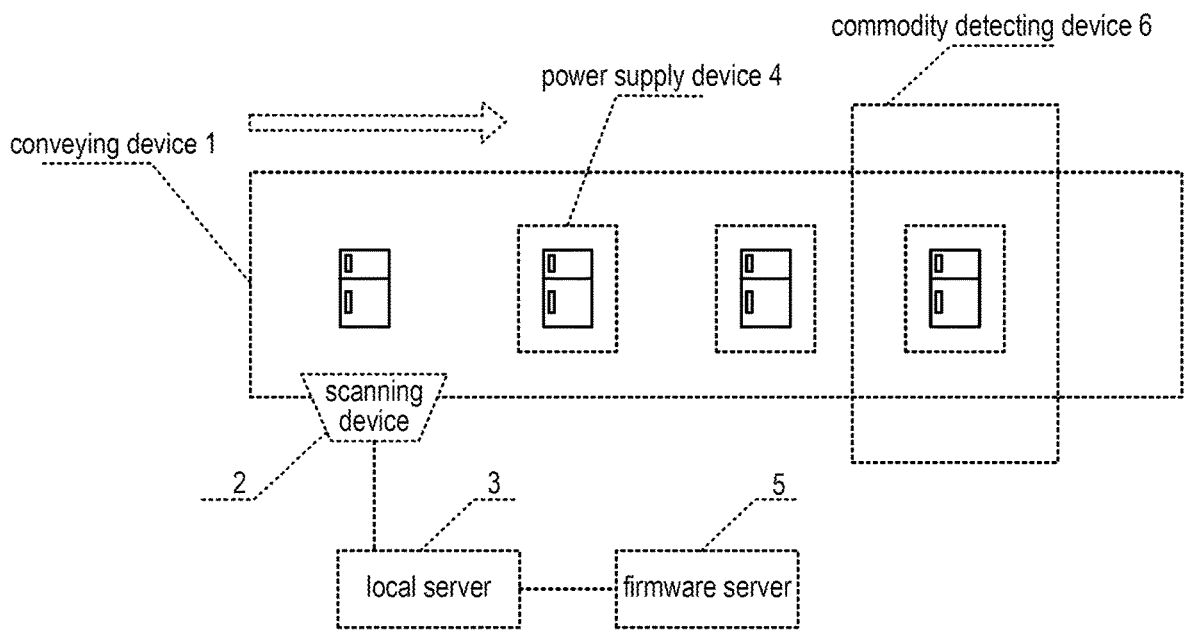
FIG. 2 is a schematic structural diagram showing a specific refrigerator production line according to embodiments of the present disclosure.

In order to more clearly illustrate the specific process of acquiring the firmware upgrade package through the backstage cloud server and the subsequent steps for completion of the refrigerator production, the present disclosure further provides a specific refrigerator production line according to some embodiments. FIG. 2 is a schematic structural diagram showing a specific refrigerator production line according to embodiments of the present disclosure.

As shown in FIG. 2, in addition to components shown in FIG. 1, the refrigerator production line further includes: a firmware server 5 and a commodity detecting device 6.

The firmware server 5 is coupled to the local server 3. The local server 3 determines the machine model of the current assembled refrigerator and the upgrade content of the public version software program; and uploads the machine model of the current assembled refrigerator and the to-be-upgraded content to the firmware server 5. The firmware server 5 determines the firmware upgrade package suitable for the current machine model by cloud computing and matching according to the received information; acquires the latest version of the firmware upgrade package; and sends the latest version of the firmware upgrade package to the local server 3.

Accordingly, the firmware server 5 sends the firmware upgrade package suitable for the current assembled refrigerator to the local server 3, thus avoiding a storage space of the local server 3 from being occupied, reducing workload of the local server 3, and facilitating the assembled refrigerator to acquire the latest version of the firmware upgrade package for upgrade.

Further, after the firmware upgrade to the assembled refrigerator is completed, the assembled refrigerator is moved along with the conveying device 1 to a position where a commodity detecting device 6 is located. The commodity detecting device 6 is configured to detect a refrigeration performance and a power of the assembled refrigerator when the assembled refrigerator is conveyed to the commodity detecting region.

In specific, the commodity detecting device 6 may include a wireless temperature probe, a wired temperature probe, and a power detecting device. In specific detection, the commodity detecting device 6 detects respective temperatures of individual compartments of the assembled refrigerator in a cooling state by respective temperature probes, to determine the refrigeration performance of the assembled refrigerator; and detects an output power of the assembled refrigerator in the cooling state by the power detecting device, to determine whether the output power of the assembled refrigerator is within a preset power range in the practical application.

Optionally, the commodity detecting device 6 may further send a control instruction to the control module, to detect whether the control module is able to execute the upgraded software program. For example, the commodity detecting device 6 first completes detection of the refrigeration performance and the power of the assembled refrigerator, determines that the assembled refrigerator has the remote control function; and the commodity detecting device 6 may further send a remote instruction to control the assembled refrigerator to power off to the control module, and further detect whether the output power of the assembled refrigerator is decreased to zero by a power detecting device, to detect whether the control module succeeds in upgrading the software program.

In summary, according to embodiments of the present disclosure, after the refrigerator production line finishes assembling the refrigerator, the firmware upgrade package is sent to the control module of the assembled refrigerator according to the identification code of individual assembled refrigerators, such that the control module which is stored with the public version software program in advance is upgraded, thus avoiding the problem where the software program of the control module is unmatched with the machine model and the function of the assembled refrigerator due to wrong installation, thereby improving the assembled refrigerator's quality rate and production efficiency.

Base on the above embodiments, in order to describe the working process of the refrigerator production line more clearly, the description is made below in combination with an implementation process of the production line according to a specific application scenario.

Figure 3:
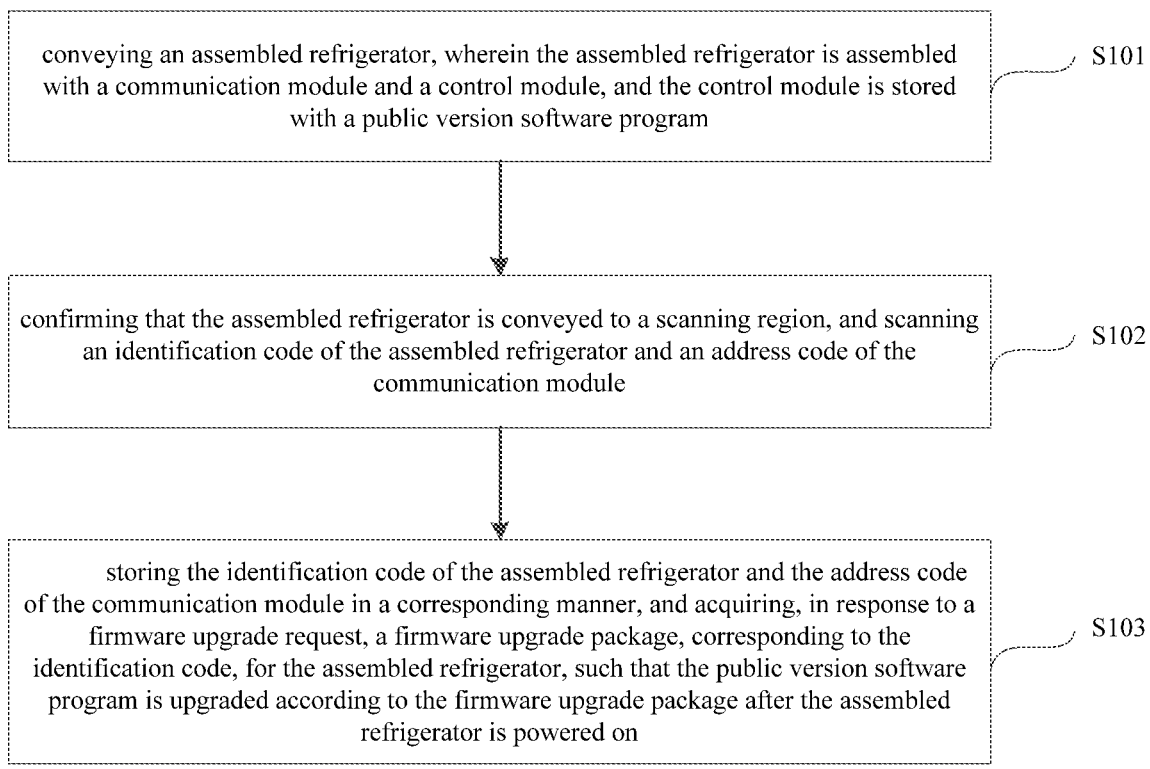
FIG. 3 is a flow chart showing a software upgrade method for a refrigerator in a production line according to embodiments of the present disclosure.

In specific, FIG. 3 is a flow chart showing a software upgrade method for a refrigerator in a production line according to embodiments of the present disclosure. As shown in FIG. 3, the software upgrade method for a refrigerator in a production line includes steps 101 to 103.

At step 101, the assembled refrigerator is conveyed. The assembled refrigerator is assembled with a communication module and a control module. The control module is stored with a public version software program.

In specific, in some embodiments, the assembled refrigerator may be conveyed by a continuous conveying device such as a conveying belt, to continuously drive the assembled refrigerator to move forward.

At step 102, it is determined that the assembled refrigerator is conveyed to a scanning region, where an identification code of the assembled refrigerator and an address code of the communication module are scanned.

In specific, a scanning device that is arranged in the production line in advance determines that the assembled refrigerator moves along with the conveying device to the scanning region of the scanning device, and scans the identification code of the assembled refrigerator and the address code of the communication module.

The specific processes of the scanning device scanning and acquiring the identification code and the address code preset on the assembled refrigerator are described above for the scanning device 2 in the refrigerator production line, and are not repeated here.

At step 103, the identification code of the assembled refrigerator and the address code of the communication module are stored in a corresponding manner, and a firmware upgrade package, corresponding to the identification code, for the assembled refrigerator is acquired in response to a firmware upgrade request, such that the public version software program is upgraded according to the firmware upgrade package after the assembled refrigerator is powered on.

In specific, the scanning device scans and acquires the identification code and the address code preset on the assembled refrigerator; and sends the identification code and the address code preset on the assembled refrigerator to the local server. The local server stores the identification code of the assembled refrigerator and the address code of the communication module in the corresponding manner.

Further, in some embodiments of the present disclosure, the assembled refrigerator may be powered on by a power supply device arranged on the conveying device, or alternatively may be powered on by an in-built power supply device. Then, the communication module of the assembled refrigerator reports its own address code to the local server; receives the identification code of the assembled refrigerator corresponding to the address code; and provides the identification code to the control module. The control module parses the received identification code to acquire a machine model of a complete machine of the assembled refrigerator; and sends the firmware upgrade request according to the machine model of the complete machine.

Further, the local server acquires, in response to the firmware upgrade request, the firmware upgrade package, corresponding to the identification code, for the assembled refrigerator according to the machine model of the complete machine in the firmware upgrade request, such that the public version software program is upgraded according to the firmware upgrade package for the assembled refrigerator.

The specific processes of the local server acquiring the corresponding firmware upgrade package and the assembled refrigerator upgrading the public version software program according to the firmware package are described in the above embodiments, and are not repeated here.

Still further, when the assembled refrigerator is conveyed to a commodity detecting region, the refrigeration performance and the power of the assembled refrigerator are detected. The specific implementation processes for detecting the refrigeration performance and the power of the assembled refrigerator are described above in embodiments of the refrigerator production line, and are not repeated here.

In summary, according to embodiments of the present disclosure, for the software upgrade method of a refrigerator in a production line, after the refrigerator is assembled, the firmware upgrade package is sent to the control module of the assembled refrigerator according to the identification code of individual assembled refrigerators, such that the control module which is stored with the public version software program in advance is upgraded, thus avoiding the problem where the software program of the control module is unmatched with the machine model and the function of the assembled refrigerator due to wrong installation, thereby improving the assembled refrigerator's quality rate and production efficiency.

The present disclosure further provides in embodiments a non-transitory computer-readable storage medium having stored therein a computer program that, when executed by a processor, achieves a software upgrade method for a refrigerator in a production line as described in the above embodiments.

In the description of the present specification, terms such as "first" and "second" are used only for purposes of description and are not intended to indicate or imply relative importance or significance or impliedly indicate quantity of the technical feature referred to. Thus, the feature defined with "first" or "second" may comprise one or more this features. In the description of the present disclosure, "a plurality of" means at least two of this features, for example, two, three, etc., unless specifically defined otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A refrigerator production line comprising:
    a conveying device configured to convey an assembled refrigerator, wherein the assembled refrigerator is assembled with a communication module and a control module, and wherein the control module stores a public version software program;
    a scanning device configured to scan an identification code of the assembled refrigerator and a Media Access Control Address (MAC) of the communication module, wherein the scanning device is triggered when the assembled refrigerator is conveyed to a scanning region; and
    a local server configured to receive, from the scanning device, and store the identification code and the MAC in a corresponding manner, wherein the local server is further configured to acquire, in response to a firmware upgrade request, a firmware upgrade package corresponding to a machine model of a complete machine of the assembled refrigerator,
    wherein after the assembled refrigerator is powered on:
    the communication module sends the MAC to the local server;
    the local server determines the identification code based on the MAC received from the communication module;
    the communication module receives the identification code from the local server and provides the identification code to the control module;
    the control module parses the identification code to acquire the machine model of the complete machine of the assembled refrigerator, and generates the firmware upgrade request based on the machine model;
    the communication module sends the firmware upgrade request to the local server; and
    the communication module receives the firmware upgrade package based on the firmware upgrade request, and the control module upgrades the public version software program according to the firmware upgrade package.

2. The refrigerator production line according to claim 1 further comprising a firmware server, wherein the firmware server is configured to send the firmware upgrade package for the assembled refrigerator to the local server.

3. The refrigerator production line according to claim 1 further comprising a commodity detecting device, wherein the commodity detecting device is configured to detect a refrigeration performance and a power of the assembled refrigerator, wherein the commodity detecting device is triggered when the assembled refrigerator is conveyed to a commodity detecting region.

4. The refrigerator production line according to claim 1, wherein a conveying mode of the conveying device includes a plate type, a chain type, a drum type, or combinations thereof.

5. The refrigerator production line according to claim 1 further comprising a power supply device installed on the conveying device, wherein the power supply device moves synchronously along with the conveying device.

6. A software upgrade method for a refrigerator in a production line comprising:
   conveying, by a convey device, an assembled refrigerator, wherein the assembled refrigerator is assembled with a communication module and a control module, wherein the control module stores a public version software program;
   scanning, by a scanning device, an identification code of the assembled refrigerator and a Media Access Control Address (MAC) of the communication module after confirming the assembled refrigerator is conveyed to a scanning region;
   receiving, from the scanning device, and storing, by a local server, the identification code and the MAC in a corresponding manner;
   sending, by the communication module the MAC to the local server;
   determining, by the local server, the identification code based on the MAC received from the communication module;
   receiving, by the communication module, the identification code from the local server;
   providing, by the communication module, the identification code to the control module;
   parsing, by the control module, the identification code to acquire a machine model of a complete machine of the assembled refrigerator;
   generating, by the control module, a firmware upgrade request based on the machine model;
   sending, by the communication module, the firmware upgrade request to the local server;
   acquiring, by the communication module, a firmware upgrade package for the assembled refrigerator from the local server based on the firmware upgrade request, wherein the firmware upgrade package is selected by the local server based on the machine model; and
   upgrading, by the control module, the public version software program according to the firmware upgrade package.

7. The software upgrade method according to claim 6 further comprising:
   confirming that the assembled refrigerator is conveyed to a commodity detecting region, and
   detecting a refrigeration performance and a power of the assembled refrigerator.

8. A non-transitory computer-readable storage medium having stored therein a computer program that, when executed by a processor, implements the software upgrade method for the assembled refrigerator in the production line according to claim 6.

* * * * *